US009611866B2

(12) United States Patent
Ryu et al.

(10) Patent No.: US 9,611,866 B2
(45) Date of Patent: Apr. 4, 2017

(54) UREA SOLUTION PUMPING MODULE

(71) Applicants: Hyundai Motor Company, Seoul (KR); Kia Motors Corporation, Seoul (KR); Hyundam Industrial Co., Ltd., Asan-si (KR)

(72) Inventors: Buyeol Ryu, Hwaseong-Si (KR); Pil Seon Choi, Anyang-si (KR); Dong Myoung Ryoo, Yongin-si (KR); Chan-Yo Jeon, Daejeon (KR); Yong-Taek Hwang, Asan-si (KR); Il-Kyu Choi, Asan-si (KR)

(73) Assignees: Hyundai Motor Company, Seoul (KR); Kia Motors Corporation, Seoul (KR); Hyundam Industrial Co., Ltd., Asan-si (KR)

( * ) Notice: Subject to any disclaimer, the term of this patent is extended or adjusted under 35 U.S.C. 154(b) by 567 days.

(21) Appl. No.: 14/145,685

(22) Filed: Dec. 31, 2013

(65) Prior Publication Data
US 2015/0050168 A1 Feb. 19, 2015

(30) Foreign Application Priority Data
Aug. 13, 2013 (KR) .................. 10-2013-0095814

(51) Int. Cl.
*F01N 3/20* (2006.01)
*F04D 29/70* (2006.01)
(Continued)

(52) U.S. Cl.
CPC ......... *F04D 29/708* (2013.01); *F01N 3/2066* (2013.01); *F04D 13/06* (2013.01);
(Continued)

(58) Field of Classification Search
CPC ......... Y02T 10/24; Y02T 10/26; Y02T 10/20; F01N 3/2066; F01N 2610/02;
(Continued)

(56) References Cited

U.S. PATENT DOCUMENTS 2,872,871 A * 2/1959 Allen .................... F02M 37/08
210/416.4
8,671,663 B2 3/2014 Buerglin et al.
(Continued)

FOREIGN PATENT DOCUMENTS

| DE | 10 2007 047 885 A1 | 6/2008 |
|---|---|---|
| DE | 10 2010 001 745 A1 | 8/2011 |
| EP | 2 556 870 A2 | 2/2013 |
| JP | 3881881 B2 | 2/2007 |
| JP | 2009-530536 A | 8/2009 |
| JP | 2013-15140 A | 1/2013 |
| JP | 2013-20805 A | 1/2013 |
| KR | 10-2010-0046183 A | 5/2010 |

(Continued)

*Primary Examiner* — Atif Chaudry
(74) *Attorney, Agent, or Firm* — Morgan, Lewis & Bockius LLP

(57) ABSTRACT

A urea solution pump unit includes: a urea solution tank having a mounting hole opened downward; a mounting flange mounted so as to close the mounting hole; a motor pump disposed in a horizontal direction on the mounting flange in the urea solution tank, and configured to suck a urea solution at one side using a pump, and discharge the urea solution to the other side through a space formed between a rotor and a stator of a motor; and a filter installed at an inlet side of the motor pump at an outside of the motor pump.

10 Claims, 8 Drawing Sheets

(51) Int. Cl.
*F04D 13/06* (2006.01)
*F04D 29/58* (2006.01)

(52) U.S. Cl.
CPC ........ *F04D 29/586* (2013.01); *F01N 2610/02* (2013.01); *F01N 2610/148* (2013.01); *F01N 2610/1426* (2013.01); *F01N 2610/1433* (2013.01); *Y02T 10/24* (2013.01); *Y02T 10/26* (2013.01); *Y10T 137/8085* (2015.04)

(58) Field of Classification Search
CPC ........... F01N 2610/10; F01N 2610/105; F01N 2610/1406; F01N 2610/1433; F01N 2610/1426; F01N 610/1413; Y10T 137/86035; Y10T 137/8085; Y10T 137/86308
See application file for complete search history.

(56) References Cited

U.S. PATENT DOCUMENTS

| | | | |
|---|---|---|---|
| 2012/0020820 A1* | 1/2012 | Francini | F04C 2/102 417/410.4 |
| 2013/0000743 A1 | 1/2013 | Crary | |
| 2013/0025269 A1* | 1/2013 | Hodgson | F01N 3/2066 60/317 |
| 2013/0037116 A1* | 2/2013 | Crary | B01D 35/027 137/1 |

FOREIGN PATENT DOCUMENTS

| | | |
|---|---|---|
| KR | 10-2010-0061160 A | 6/2010 |
| WO | WO 2009/007405 A1 | 1/2009 |

\* cited by examiner

UREA SOLUTION PUMPING MODULE

CROSS-REFERENCE TO RELATED APPLICATION

The present application claims priority of Korean Patent Application Number 10-2013-0095814 filed Aug. 13, 2013, the entire contents of which application is incorporated herein for all purposes by this reference.

BACKGROUND OF INVENTION

Field of Invention

The present invention relates to a urea solution pumping module which pumps a urea solution stored in a urea solution tank to an injector at a predetermined pressure so that the injector injects the urea solution to exhaust gas in an exhaust line.

Description of Related Art

Environmentally-friendly vehicles have been globally developed, and exhaust gas emission standards for vehicles of the respective countries have gradually become stricter. In addition, due to regulations on carbon dioxide, vehicle makers are developing environmentally-friendly diesel vehicles.

Nitrogen oxide and particulate matters are cores of the exhaust gas emission standards for the diesel vehicles, and particularly, as a technology of reducing nitrogen oxide, an LNT and a UREA-SCR attract attention. Particularly, the UREA-SCR is useful to reduce nitrogen oxide emitted from diesel engines of large vehicles.

The UREA-SCR is a selective reduction system in which a harmless urea solution is injected into an exhaust system, the injected urea solution is converted into ammonia by thermal decomposition and hydrolysis, and the converted ammonia reacts with nitrogen oxide in exhaust gas so as to be converted into harmless substances such as water and nitrogen, and the UREA-SCR requires a system for separately storing and supplying the urea solution.

The system for storing and supplying the urea solution includes a urea solution tank, a pump, an injection port, piping, wiring, and various sensors, the pump particularly requires a structure of stably pumping a strong basic urea solution, and it is necessary to downsize the urea solution tank in order to reduce a length in an up and down direction.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a urea solution pumping module which improves design freedom by stably pumping a strong basic urea solution to an injector, and reducing a height of a urea solution tank by downsizing the urea solution tank.

Various aspects of the present invention provide for a urea solution pump unit including: a urea solution tank having a mounting hole opened downward; a mounting flange mounted so as to close the mounting hole; a motor pump disposed in a horizontal direction on the mounting flange in the urea solution tank, and configured to suck a urea solution at one side using a pump, and discharge the urea solution to the other side through a space formed between a rotor and a stator of a motor; and a filter installed at an inlet side of the motor pump at an outside of the motor pump.

The urea solution pump unit may further include a heater module having one side and the other side fixed to the mounting flange, and configured to cover the outside of the motor pump, and generate heat using power supplied from the outside.

The heater module may include: a guide and a PCT heater mounted in the guide; first and second heater terminals disposed while interposing the PCT heater therebetween, and supplied with power from the outside; and an exterior molding configured to enclose outsides of the PCT heater, the guide, and the first and second heater terminals.

The urea solution pump unit may further include a sensor mounting tube penetrating one side of the mounting flange or installed at an outside of the mounting flange, in which a level sensor and a temperature sensor are disposed in the sensor mounting tube, and a sensor terminal portion, which is supplied with power from the outside, is formed at the sensor mounting tube.

An insertion portion housing having an outlet insertion portion in which an outlet side of the motor pump is mounted may be formed at an upper side of the mounting flange, and a first connecting passage may be formed at a center portion of the outlet insertion portion in a horizontal direction so as to correspond to an outlet of the motor pump.

On an inner surface of the outlet insertion portion, an inside O-ring disposed to have an inlet of the first connecting passage to be disposed at a center of the inside O-ring, an outside O-ring disposed outward from the inside O-ring at an interval, and a pump power terminal disposed between the inside O-ring and the outside O-ring and configured to be supplied with power for operating the motor pump from the outside may be disposed.

The urea solution pump unit may further include an elastic member configured to elastically support the filter toward the motor pump side.

A filter O-ring, which is in close contact with an outer circumferential surface of an inlet side of the motor pump, may be disposed on an inner circumferential surface of the filter.

A second connecting passage having an upper portion connected to the first connecting passage and a lower portion connected to the outside may be formed in the mounting flange, and a check valve or a nozzle, which circulates a part of the urea solution into the urea solution tank, may be disposed on an upper end portion of the second connecting passage.

A discharge port may be disposed on a lower end portion of the second connecting passage, and a pressure sensor may be disposed at one side of the discharge port.

According to various aspects of the present invention, the motor pump, which substantially pumps a urea solution, is not vertically formed, but formed horizontally in the pumping module unit, thereby designing a urea solution storage tank to have a lower height.

In addition, a cover, which covers an outer periphery of the motor pump horizontally disposed on the mounting flange, is configured as a heater module, thereby protecting the motor pump, and effectively preventing the urea solution from freezing.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
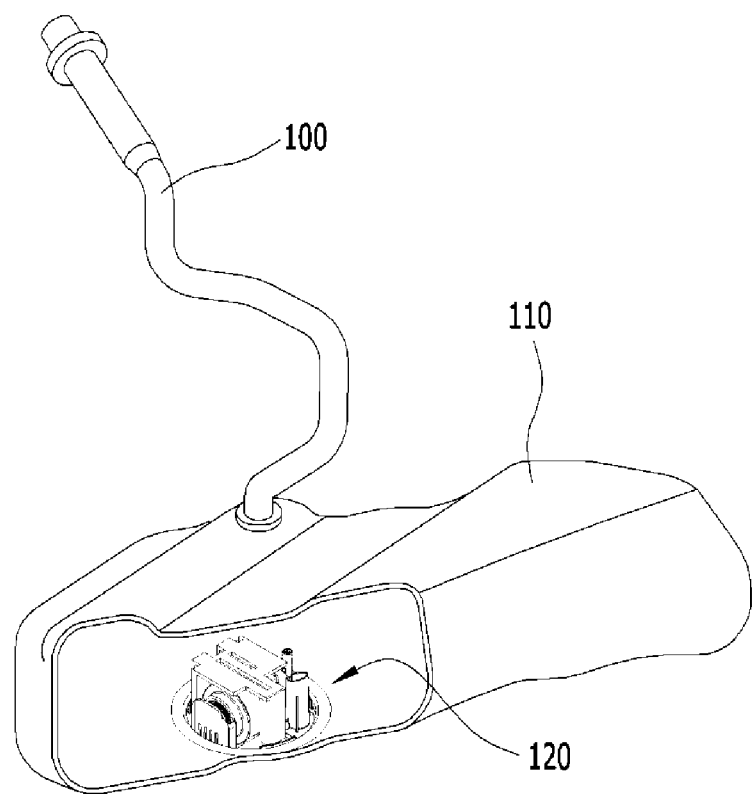
FIG. 1 is a schematic configuration diagram of an exemplary urea solution supply system according to the present invention.

FIG. 1 is a schematic configuration diagram of a urea solution supply system according to various embodiments of the present invention.

Referring to FIG. 1, a urea solution pumping module includes a filling tube 100, a urea solution tank 110, and a pumping module 120. The urea solution tank 110 has an open hole formed therein to be opened downward, and the pumping module 120 is disposed to close the open hole.

A urea solution is stored through the filling tube 100, the pumping module 120 pumps the urea solution stored in the urea solution tank 110 to an injector (not illustrated) at a predetermined pressure, and the injector injects the urea solution into an exhaust line (not illustrated) under a predetermined condition.

Figure 2:
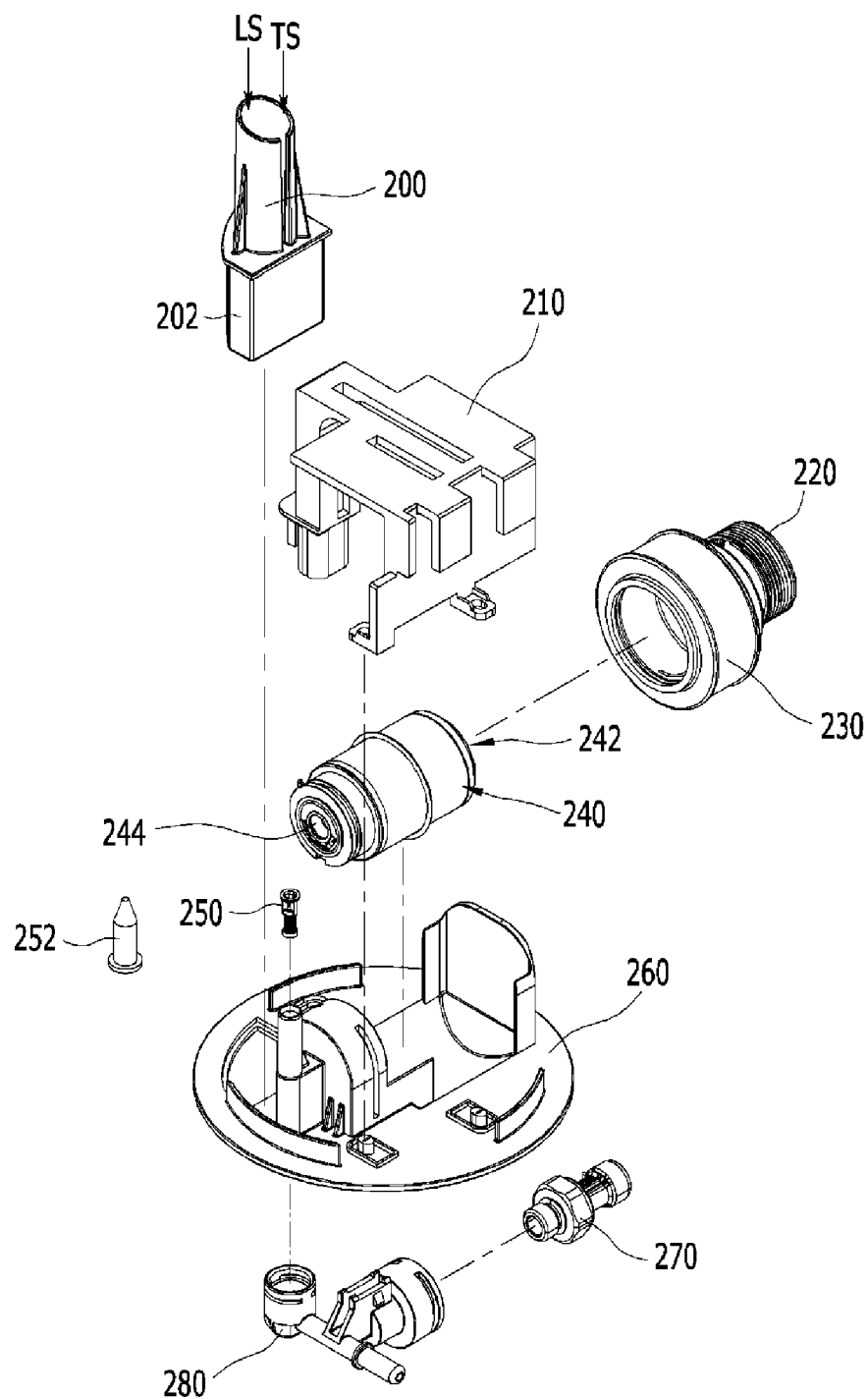
FIG. 2 is an exploded perspective view of an exemplary urea solution pumping module according to the present invention.

FIG. 2 is an exploded perspective view of the urea solution pumping module according to various embodiments of the present invention.

Referring to FIG. 2, the pumping module 120 of the urea solution pumping module includes a sensor mounting tube 200, a heater module 210, an elastic member 220, a filter 230, a motor pump 240, a check valve 250 or a nozzle 252, a mounting flange 260, a discharge port 280, and a pressure sensor 270.

The sensor mounting tube 200 includes a sensor terminal portion 202 formed at a lower end portion thereof, the sensor mounting tube 200 is opened upward, and a level sensor LS and a temperature sensor TS are mounted in the sensor mounting tube 200. The sensor mounting tube may be integrally formed with the mounting flange 260, and in this case, the sensors and the terminal portion 202 may be assembled or welded on the outside of the mounting flange. One will appreciate that such integral components may be monolithically formed.

The motor pump 240 is installed on the mounting flange 260 in a horizontal direction, an inlet 242 is formed at one side of the motor pump 240, an outlet 244 is formed at the other side of the motor pump 240, and a filter 230 and an elastic member 220 are disposed at an inlet side of the motor pump 240.

The check valve 250 is disposed on the mounting flange 260 so as to correspond to the outlet 244 of the motor pump 240, the discharge port 280 is disposed at a lower side of the mounting flange 260 so as to correspond to the check valve 250 or the nozzle 252, and the pressure sensor 270 is disposed at one side of the discharge port 280.

The check valve 250 or the nozzle 252 circulates a thawed part of the urea solution into the urea solution tank 110 in a state in which the urea solution is frozen, thereby achieving a function and an effect of reducing an overall thawing time.

Figure 3:
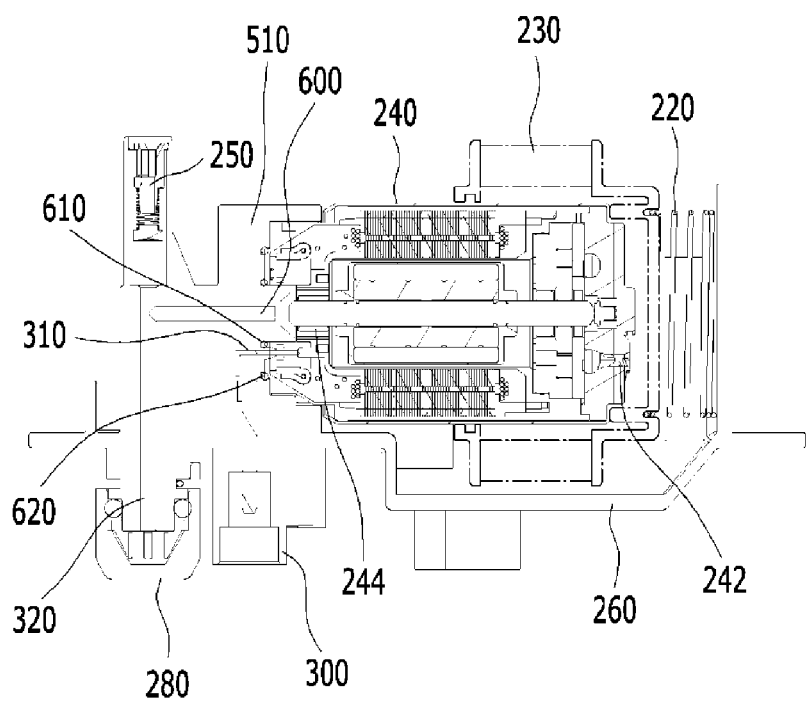
FIG. 3 is a cross-sectional view illustrating a state in which a motor pump of an exemplary urea solution pumping module according to the present invention is mounted on a mounting flange.

FIG. 3 is a cross-sectional view illustrating a state in which the motor pump of the urea solution pumping module according to various embodiments of the present invention is mounted on the mounting flange.

Referring to FIG. 3, an insertion portion housing 510 is formed at an upper side of the mounting flange 260, the filter 230 is disposed at the inlet 242 side of the motor pump 240 in a state in which the outlet 244 side of the motor pump 240 is inserted into the insertion portion housing 510, and the elastic member 220 elastically supports the filter 230 toward the motor pump 240 side.

A first connecting passage 600 is formed in the insertion portion housing 510 in a horizontal direction so as to correspond to the outlet 244, and an end portion of the first connecting passage 600 is connected to a second connecting passage 320 that is vertically formed. The check valve 250 or the nozzle 252 is disposed on an upper end portion of the second connecting passage 320, and the discharge port 280 is disposed on a lower end portion of the second connecting passage 320.

A power connecting portion 300, which transmits power from the outside to the motor pump 240, is formed at a lower side of the mounting flange 260, and a power connecting terminal 310, which connects power supplied through the power connecting portion 300 to the motor pump 240, is formed in the mounting flange 260.

In order to prevent the urea solution outside from permeating the power connecting terminal 310, an inside O-ring 610 and an outside O-ring 620 are disposed at an inside and an outside of the power connecting terminal 310, respectively.

In various embodiments of the present invention, the motor pump 240 is disposed in a horizontal direction on the mounting flange 260 in the urea solution tank 110 so as to suck the urea solution at one side and discharge the urea solution to the other side through a space formed between a rotor and a stator.

Figure 4A:
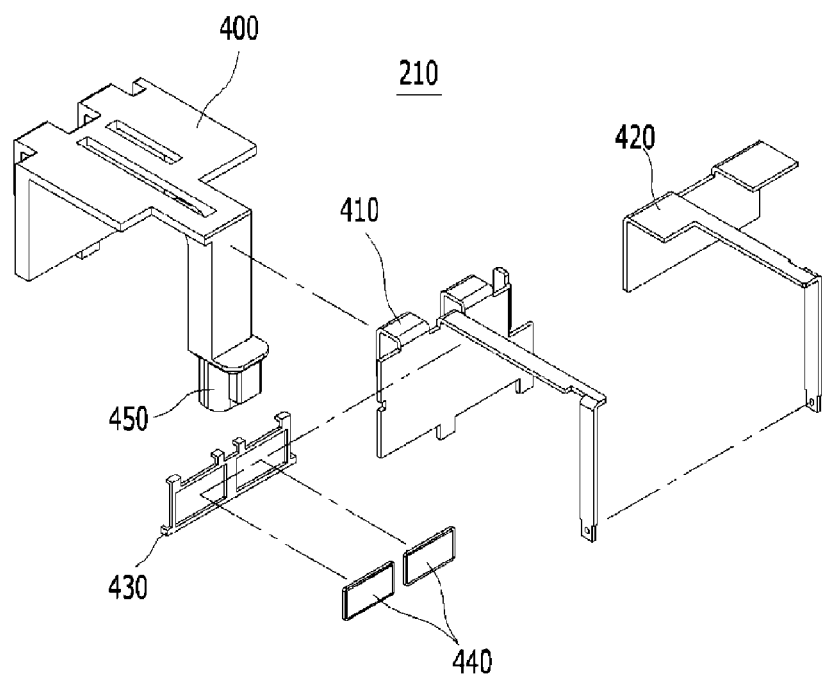
FIG. 4A is an exploded perspective view of a heater module of an exemplary urea solution pumping module according to the present invention.

FIG. 4A is an exploded perspective view of the heater module of the urea solution pumping module according to various embodiments of the present invention.

Referring to FIG. 4A, the heater module 210 includes an exterior molding 400, a first heater terminal 410, a second heater terminal 420, a guide 430, and PCT heaters 440.

Two PCT heaters 440 are disposed inside the guide 430, respectively, and the first heater terminal 410 and the second heater terminal 420 are disposed while interposing the PCT heaters 440 therebetween. Further, the exterior molding 400 completely encloses the first and second heater terminals 410 and 420, the guide 430, and the PCT heaters 440.

Further, one side of the exterior molding 400 is disposed to penetrate the mounting flange 260 so as to form a heater terminal portion 450, and the other side of the exterior molding 400 is fixed to an upper side of the mounting flange 260.

In various embodiments of the present invention, the heater module 210 may serve simultaneously to cover an upper portion and left and right surfaces of the motor pump 240 and heat the urea solution.

Figure 4B:
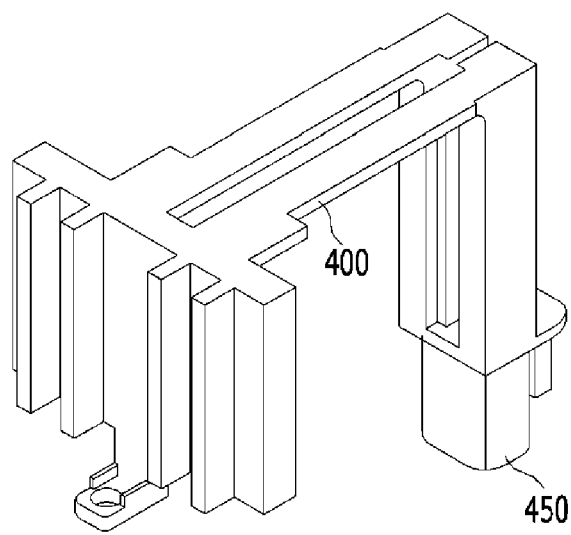
FIG. 4B is an exploded perspective view of an exemplary heater module according to the present invention.
Figure 4B:
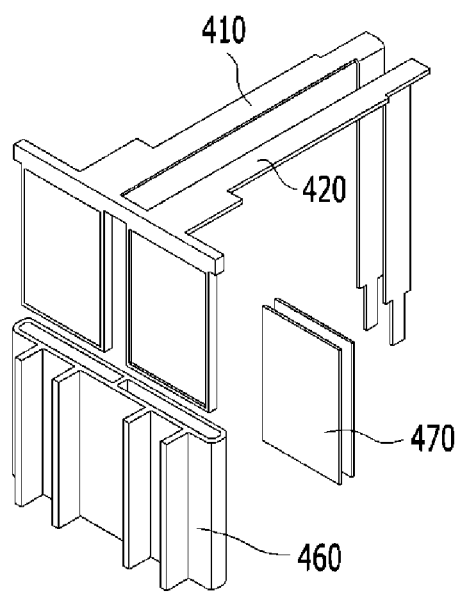

FIG. 4B is an exploded perspective view of a heater module according to various embodiments of the present invention.

Referring to FIG. 4B, the heater module 210 includes an exterior molding 400, a first heater terminal 410, a second heater terminal 420, an insulating material 470, an aluminum tube 460, and a PCT heater 440 (see FIG. 4A).

The PCT heater 440 is disposed between terminal boards of the first and second heater terminals 410 and 420. Further, the first and second heater terminals 410 and 420 and the terminal boards are inserted into the aluminum tube 460. Further, the insulating material 470 is interposed between the aluminum tube 460 and the terminal board.

Further, the terminal board and the PCT heater 440 are fixed to each other by compressing the aluminum tube 460, thereby improving reliability and mass production.

Further, the exterior molding 400 completely encloses the first and second heater terminals 410 and 420 and the aluminum tube 460.

Further, one side of the exterior molding 400 is disposed to penetrate the mounting flange 260 so as to form a heater terminal portion 450, and the other side of the exterior molding 400 is fixed to an upper side of the mounting flange 260.

In various embodiments of the present invention, the heater module 210 may serve simultaneously to cover an upper portion and left and right surfaces of the motor pump 240 and heat the urea solution.

Figure 5:
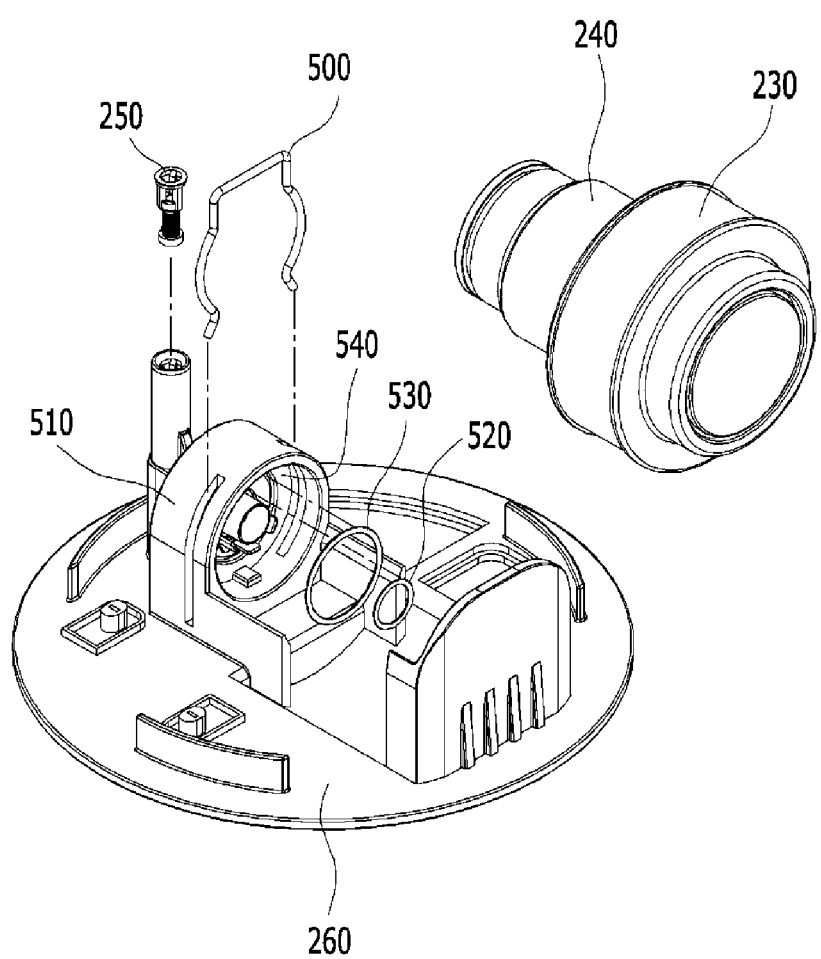
FIG. 5 is a partial exploded perspective view of the motor pump and the mounting flange of an exemplary urea solution pumping module according to the present invention.

FIG. 5 is a partial exploded perspective view of the motor pump and the mounting flange of the urea solution pumping module according to various embodiments of the present invention.

Referring to FIG. 5, the insertion portion housing 510 is formed at an upper side of the mounting flange 260, and an outlet insertion portion 540 is formed at one side of the insertion portion housing 510. Further, an inside O-ring 520 and an outside O-ring 530 are disposed on an inner surface of the outlet insertion portion 540 so as to correspond to the outlet 244.

The outlet 244 side of the motor pump 240, which is inserted into the outlet insertion portion 540 of the insertion portion housing 510, is fixed by a clip 500 that is engaged with the insertion portion housing 510. In addition, the inlet 242 side of the motor pump 240 is inserted into an inner circumferential surface of the filter 230.

Figure 6:
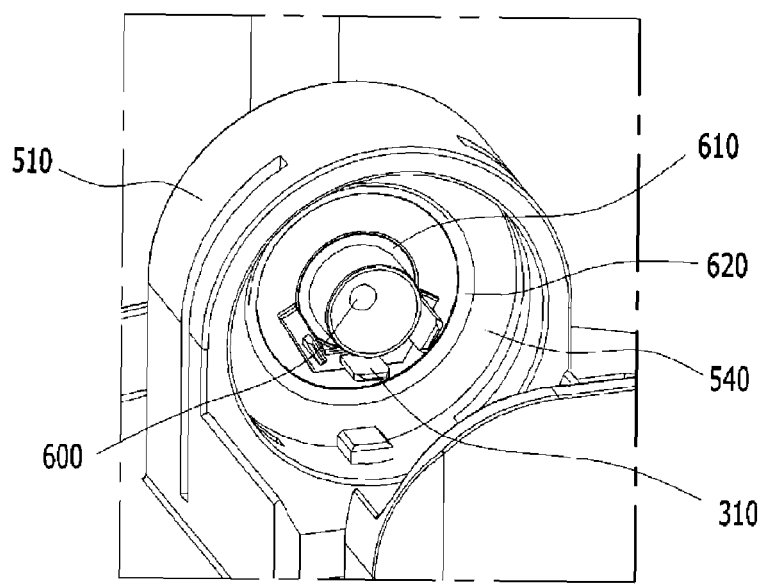
FIG. 6 is a partial perspective view of a mounting bracket of an exemplary urea solution pumping module according to the present invention.

FIG. 6 is a partial perspective view of a mounting bracket of the urea solution pumping module according to various embodiments of the present invention.

Referring to FIG. 6, the first connecting passage 600 is formed at an inner center portion of the outlet insertion portion 540 that is formed at one side of the insertion portion housing 510, and the power connecting terminals 310 are disposed to protrude at an outside of the first connecting passage 600 at a predetermined interval.

The inside O-ring 610 and the outside O-ring 620 are mounted on the inner surface of the outlet insertion portion 540 while interposing the power connecting terminals 310 therebetween. The inside O-ring 610 is disposed between the first connecting passage 600 and the power connecting terminal 310, and the outside O-ring 620 is disposed at an outside of the power connecting terminal 310.

Figure 7:
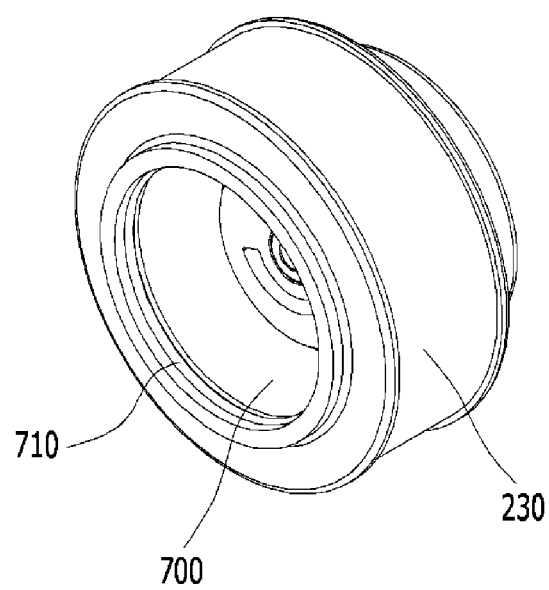
FIG. 7 is a perspective view of a filter of an exemplary urea solution pumping module according to the present invention.

FIG. 7 is a perspective view of the filter of the urea solution pumping module according to various embodiments of the present invention.

Referring to FIG. 7, a pump insertion portion 700 is formed in the filter 230, and a filter O-ring 710, which forms a sealing structure with an outer circumferential surface of the inlet 242 side of the motor pump 240, is disposed on an inner circumferential surface of the pump insertion portion 700.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A urea solution pump unit comprising:
   a urea solution tank having a mounting hole opened downward;
   a mounting flange mounted to close the mounting hole;
   a motor pump disposed in a horizontal direction on the mounting flange in the urea solution tank, and configured to draw a urea solution at one side using a pump, and discharge the urea solution to another side through a space formed between a rotor and a stator of a motor;
   a filter installed at an inlet side of the motor pump at an outside of the motor pump;
   a heater module having one side and the other side fixed to the mounting flange, and configured to cover the outside of the motor pump, and generate heat using power supplied from the outside,
   wherein the heater module includes:
      a guide and a Positive Temperature Coefficient (PTC) heater mounted in the guide;
      first and second heater terminals disposed while interposing the PTC heater therebetween, and configured to be supplied with power from the outside; and
      an exterior molding configured to enclose outsides of the PTC heater, the guide, and the first and second heater terminals.

2. The urea solution pump unit of claim 1, further comprising:
   a sensor mounting tube penetrating one side of the mounting flange or installed at an outside of the mounting flange, wherein a level sensor and a temperature sensor are disposed in the sensor mounting tube, and a sensor terminal portion, which is supplied with power from the outside, is formed at the sensor mounting tube.

3. The urea solution pump unit of claim 1, wherein:
an insertion portion housing having an outlet insertion portion in which an outlet side of the motor pump is mounted is formed at an upper side of the mounting flange; and
a first connecting passage is formed at a center portion of the outlet insertion portion in a horizontal direction so as to correspond to an outlet of the motor pump.

4. The urea solution pump unit of claim 3, wherein on an inner surface of the outlet insertion portion:
an inside O-ring disposed to have an inlet of the first connecting passage disposed at a center of the inside O-ring;
an outside O-ring disposed outward from the inside O-ring at an interval; and
a pump power terminal disposed between the inside O-ring and the outside O-ring and configured to be supplied with power for operating the motor pump from the outside are disposed.

5. The urea solution pump unit of claim 1, further comprising:
an elastic member configured to elastically support the filter toward the motor pump side.

6. The urea solution pump unit of claim 1, wherein:
a filter O-ring, which is in close contact with an outer circumferential surface of an inlet side of the motor pump, is disposed on an inner circumferential surface of the filter.

7. The urea solution pump unit of claim 3, wherein:
a second connecting passage having an upper portion connected to the first connecting passage and a lower portion connected to the outside is formed in the mounting flange, and a check valve or a nozzle, which circulates a part of the urea solution into the urea solution tank, is disposed on an upper end portion of the second connecting passage.

8. The urea solution pump unit of claim 7, wherein:
a discharge port is disposed on a lower end portion of the second connecting passage, and a pressure sensor is disposed at one side of the discharge port.

9. A urea solution pump unit comprising:
a urea solution tank having a mounting hole opened downward;
a mounting flange mounted to close the mounting hole;
a motor pump disposed in a horizontal direction on the mounting flange in the urea solution tank, and configured to draw a urea solution at one side using a pump, and discharge the urea solution to another side through a space formed between a rotor and a stator of a motor;
a filter installed at an inlet side of the motor pump at an outside of the motor pump;
a heater module having one side and the other side fixed to the mounting flange, and configured to cover the outside of the motor pump, and generate heat using power supplied from the outside; and
a sensor mounting tube penetrating one side of the mounting flange or installed at an outside of the mounting flange, wherein a level sensor and a temperature sensor are disposed in the sensor mounting tube, and a sensor terminal portion, which is supplied with power from the outside, is formed at the sensor mounting tube.

10. A urea solution pump unit comprising:
a urea solution tank having a mounting hole opened downward;
a mounting flange mounted to close the mounting hole;
a motor pump disposed in a horizontal direction on the mounting flange in the urea solution tank, and configured to draw a urea solution at one side using a pump, and discharge the urea solution to another side through a space formed between a rotor and a stator of a motor; and
a filter installed at an inlet side of the motor pump at an outside of the motor pump,
wherein:
an insertion portion housing having an outlet insertion portion in which an outlet side of the motor pump is mounted is formed at an upper side of the mounting flange; and
a first connecting passage is formed at a center portion of the outlet insertion portion in a horizontal direction so as to correspond to an outlet of the motor pump, and
wherein on an inner surface of the outlet insertion portion:
an inside O-ring disposed to have an inlet of the first connecting passage disposed at a center of the inside O-ring;
an outside O-ring disposed outward from the inside O-ring at an interval; and
a pump power terminal disposed between the inside O-ring and the outside O-ring and configured to be supplied with power for operating the motor pump from the outside are disposed.

* * * * *